United States Patent
Prozzo et al.

(10) Patent No.: US 8,740,992 B2
(45) Date of Patent: Jun. 3, 2014

(54) AFTERCLEARING AGENTS

(75) Inventors: Biancamaria Prozzo, Basel (CH);
Jasmin Kreyer, Saint-Louis (FR);
Stefano Prando, Castronno (IT)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/384,344

(22) PCT Filed: Jul. 6, 2010

(86) PCT No.: PCT/EP2010/059643
§ 371 (c)(1),
(2), (4) Date: Jan. 17, 2012

(87) PCT Pub. No.: WO2011/018279
PCT Pub. Date: Feb. 17, 2011

(65) Prior Publication Data
US 2012/0129754 A1    May 24, 2012

(30) Foreign Application Priority Data

Aug. 13, 2009 (EP) ..................................... 09167829

(51) Int. Cl.
*D06P 5/08* (2006.01)

(52) U.S. Cl.
USPC ................. 8/115.65; 8/636; 8/115.54; 8/543; 8/551; 8/553; 510/360; 510/276

(58) Field of Classification Search
USPC ........................... 8/115.51, 636; 510/360, 276
See application file for complete search history.

(56) References Cited

U.S. PATENT DOCUMENTS

| 4,548,744 | A | * | 10/1985 | Connor .......................... 510/350 |
| 5,277,812 | A | | 1/1994 | Hu et al. |
| 5,698,476 | A | * | 12/1997 | Johnson et al. ............... 442/121 |
| 6,340,661 | B1 | * | 1/2002 | van Deurzen et al. ......... 510/302 |
| 6,410,503 | B1 | * | 6/2002 | Masschelein ................. 510/516 |
| 6,908,490 | B2 | | 6/2005 | Boeckh et al. |
| 2002/0010121 | A1 | * | 1/2002 | Van Deurzen et al. ........ 510/309 |
| 2004/0139559 | A1 | * | 7/2004 | Detering et al. .................. 8/181 |
| 2005/0112151 | A1 | | 5/2005 | Horng |
| 2008/0005852 | A1 | * | 1/2008 | Hu et al. ...................... 8/115.51 |

FOREIGN PATENT DOCUMENTS

| EP | 0 244 078 | 11/1987 |
| WO | 97/35067 | 9/1997 |

OTHER PUBLICATIONS

International Search Report and Written Opinion regarding corresponding application No. PCT/EP2010/059643, dated Aug. 20, 2010.

* cited by examiner

*Primary Examiner* — Harold Pyon
*Assistant Examiner* — Katie L Hammer

(57) ABSTRACT

A composition comprising (a) a homo- or copolymer obtainable by polymerisation of at least one ethylenically un-saturated nitrogen-containing heterocyclic compound and (b) a polyethyleneimine, is suitable for afterclearing a printed or dyed textile material, in particular cotton fibres dyed or printed with reactive dyes.

8 Claims, No Drawings

AFTERCLEARING AGENTS

CROSS REFERENCE TO RELATED APPLICATIONS

This application is the National Phase of International Application PCT/EP2010/059643 filed Jul. 6, 2010 which designated the U.S. and which claims priority to European (EP) Pat, App. No. 09167829.2 filed Aug. 13, 2009. The noted applications are incorporated herein by reference.

The present invention relates to a composition comprising a polymer derived from an N-vinyl heterocycle and a polyethyleneimine and a process for afterclearing a printed or dyed textile material.

The dyeing or printing of cellulose fibres with reactive or substantive dyes usually requires repeated rinsing steps using water baths at temperatures up to 98° C. Thus, the part of the dye is removed which is only loosely bound to the surface of the cellulose and which otherwise may cause staining of other fabrics.

For economic and ecological reasons there is a demand for reducing the number of rinsing steps and to decrease the temperature of the rinsing baths.

U.S. Pat. No. 6,039,768 describes a process for fixing reactive or substantive dyes on cellulosic fibre material comprising treating the fibre before, during or after dyeing with a liquor containing copolymers of N-vinyl-N-heterocycles, like vinylimidazole/vinyl-pyrrolidone-copolymers. The fastness properties of the dyeings obtained by this process, however, do not meet the highest requirements.

It has now been found that the shortcomings mentioned above can be overcome by afterclearing the dyed cellulose fibres with a liquor containing at least one homo- or copolymer of a N-vinyl-N-heterocycle and at least one polyethyleneimine.

The present invention accordingly relates to a composition comprising
(a) a homo- or copolymer obtainable by polymerisation of at least one ethylenically unsaturated nitrogen-containing heterocyclic compound and
(b) a polyethyleneimine.

The homopolymers suitable as component (a) of the compositions according to the invention can typically be prepared by polymerising an ethylenically unsaturated nitrogen-containing heterocyclic compound in suitable manner.

Ethylenically unsaturated nitrogen-containing heterocycles suitable for the preparation of the homo- or copolymers according to component (a) are, for example, pyrrole, pyrrolidine, pyridine, quinoline, isoquinoline, purine, pyrazole, imidazole, triazole, tetrazole, indolizine, pyridazine, pyrimidine, pyrazine, indole, isoindole, oxazole, oxazolidone, oxazolidine, morpholine, piperazine, piperidine, isoxazole, thiazole, isothiazole, indoxyle, isatine, dioxindole and hydanthoines as well as derivatives thereof.

Copolymers suitable as component (a) of the compositions according to the invention can be prepared by polymerising an unsaturated nitrogen-containing heterocycle in the presence of at least one further copolymerisable monomer.

A further copolymerisable monomer can be another nitrogen-containing heterocycle or another unsaturated compound like, for instance, vinyl amine, ally amine, acrylic acid, methacrylic acid, methyl acrylate, methyl methacrylate, vinyl acetate, acrylamide and methacrylamide.

The preparation of the polymers can be carried out in a manner known per se, e.g. by ionically or, preferably, radically initiated polymerisation of the corresponding monomers e.g. in solution suspension or emulsion. This polymerisation is preferably carried out in solution with a peroxide, persulfate or an azo compound, like $K_2S_2O_8$ or azo-(bis)-isobutyronitrile, as radical chain starter, which may be present e.g. in an amount of 0.005 to 10% by weight, based on the monomers used.

Preferably the composition according to the invention contains as component (a) a polymer obtainable by homopolymerisation of N-vinylpyrrolidone or copolymerisation of N-vinylimidazole and N-vinylpyrrolidone.

Especially preferred as component (a) are polymers, in particular copolymers obtainable by polymerising 60 to 100 mol-%, preferably 70 to 90 mol-%, of N-vinylpyrrolidone and 0 to 40 mol-%, preferably 10 to 30 mol-%, of N-vinylimidazole.

Independently of the liquor ratio, the homopolymers or copolymer according to component (a) is typically used in an amount of 0.01 to 4.0% by weight, preferably of 0.02 to 2.0% by weight and, particularly preferably, of 0.8 to 2.5% by weight of active content, based on the weight of the textile material.

The polyethylenimines suitable as component (b) can likewise be prepared according to known methods.

Pure polyethyleneimine (PEI) having a molecular weight $M_w$ (weight average) from about 200 g/mol to about 5,000,000 g/mol is generated by acid-catalysed ring-opening polyaddition of the highly reactive aziridine.

The branched polymer obtained by this method has primary, secondary and tertiary amino groups and can be modified, for example by reaction with carboxylic acids or carboxylic acid derivatives like chlorides, esters, anhydrides or amides, whereupon partially amidated PEIs are formed.

Further modified polyethyleneimines can be prepared by reaction of PEI with alkylene oxides, like ethylene oxide or propylene oxide, thus generating partially ethoxylated or propoxylated polyethyleneimine.

Such pure or modified PEIs are commercially available, for example under the designation Lupasol® (supplied by BASF) or Epomin® (supplied by Nippon Shokubai).

Preferably the compositions according to the invention contain a modified polyethyleneimine as component (b), in particular a partially amidated or a partially alkoxylated polyethyleneimine.

In a further preferred embodiment, the compositions according to the invention contain as component (b) a partially amidated polyethyleneimine obtainable by reaction of a polyethyleneimine with a carboxylic acid, anhydride, ester, chloride or amide.

In a further preferred embodiment, the compositions according to the invention contain as component (b) a partially ethoxylated polyethyleneimine obtainable by reaction of a polyethyleneimine with ethylene oxide.

Independently of the liquor ratio, the PEI according to component (b) is typically used in an amount of 0.01 to 4.0% by weight, preferably of 0.05 to 2.0% by weight and, particularly preferably, of 0.1 to 0.25% by weight of active content, based on the weight of the textile material.

The ratio of the amounts of components (a) and (b) can vary within wide limits. Preferably the amount of component (a) is 20 to 80% by weight, more preferably 30 to 70% by weight, particularly preferred 40 to 60% by weight, based on the total weight of components (a) +(b).

Correspondingly, the amount of component (b) is 20 to 80% by weight, more preferably 30 to 70% by weight, particularly preferred 40 to 60% by weight, based on the total weight of components (a)+(b).

A further object of the present invention is a process for afterclearing a printed or dyed textile material, preferably cellulosic textile fibre material, which comprises treating said printed or dyed textile material with an aqueous liquor containing a composition as described above.

The process of this invention is preferably carried out by first dyeing the cellulosic fibre material in customary manner and then aftertreating it with a fresh aqueous liquor containing the composition containing components (a) and (b) in the amount indicated above. The dyed cellulosic fibre material can then be dehydrated without any additional rinsing process and dried in customary manner.

The cellulosic fibre material may be, for example, regenerated cellulose or, preferably, natural cellulose, typically viscose staple, viscose silk, hemp, linen, jute or, preferably, cotton, and also fibre blends with synthetic fibres, such as cotton/polyamide blends or, preferably, cotton/polyester blends.

The textile goods may be used in any form of presentation, e.g. in the form of loose stack consisting completely or partially of native or regenerated cellulose, yarn, cheese, skein, wovens, knitgoods or felt.

Dyeings are carried out with substantive or, preferably, reactive dyes, all customary direct and reactive dyes being suitable, such as those described in the Colour Index, 3. Edition (1971) and in the addenda thereto under the headings "Direct Dyes" and "Reactive Dyes".

Typical examples of said dyes are sulfo group-containing monoazo, polyazo, metal complexazo, anthraquinone, phthalocyanine, formazane or dioxazine dyes which, in the case of reactive dyes, carry at least one fibre-reactive group, e.g. a halotriazinyl group or a vinyl sulfonyl radical.

The dyeings of the cellulosic fibre material with the dye can be carried out in customary manner by the exhaust process or by a two-step process, for example by padding or printing and subsequent fixation.

Dyeing with substantive dyes is preferably carried out by an exhaust process at a neutral to acid pH.

Dyeing with reactive dyes is preferably carried out by an exhaust process or by padding with subsequent fixation of the dye on the fibre. Fixation can be effected in customary manner, typically with the action of heat by a steam process or by a thermosol process or, preferably, by a cold pad-batch method, the impregnated fibre material preferably being stored at room temperature.

Subsequently the dyed material is usually rinsed with water at elevated temperature, for example at 40-80° C., preferably at 50-70° C.

The aftertreatment is preferably carried out by an exhaust process. The liquor ratio can be chosen from within a wide range and is typically from 1:3 to 1:40 and, preferably, from 1:5 to 1:20.

Special appliances are not required. It is possible to use, for example, the customary dyeing apparatus, e.g. open baths, winch becks, jiggers, or paddle jet or circulation apparatus.

Processing is conveniently carried out in the temperature range from e.g. 40 to 80° C. and, preferably, from 50 to 70° C. The treatment time may typically be from 10 to 100 minutes and, preferably, from 30 to 60 minutes. The pH of the liquor is usually in the range from 8 to 13 and, preferably, from 10 to 12.

In addition to the composition containing components (a) and (b), the liquor can contain other customary additives, typically electrolytes such as sodium chloride or sodium sulfate, dispersants, wetting agents and antifoams.

The novel process gives dyeings and prints of reactive or substantive dyes on cellulosic fibre material which have an outstanding fastness to wet treatments, such as fastness to washing and water and fastness to chlorine without, however, adversely affecting the colour yield, shade or the light fastness properties.

While respective customary aftertreatment processes are carried out almost at boiling temperature, moderate temperatures (60-80° C.) are adequate for successfully conducting the afterclearing process according to the invention.

Furthermore, the number of rinsing steps can be reduced in comparison to conventional prior art methods.

The following Examples illustrate the invention in more detail.

EXAMPLE 1

A 10 g piece of a bleached cotton tricot is dyed by exhaust process with a blue reactive dye (Novacron Blue FN-R, supplied by Huntsman) at a liquor ratio of 1:10 (2.0 BZT). The dyed material is taken out of the liquor and rinsed in a water bath for 10 minutes at 60° C. The dyed cotton tricot piece is then treated for 10 minutes at 60° C. with a fresh aqueous liquor comprising 2 g/l of an aqueous solution containing 10% by weight of a N-vinylimidazole/N-vinylpyrrolidone-copolymer, prepared from 20 mol-% of N-vinylimidazole and 80 mol-% of N-vinylpyrrolidone, and 0.5 g/l of an aqueous solution containing 50% by weight of a modified branched PEI having a molecular weight (weight average) $M_w$=750,000 g/mol, pH=11. Subsequently, the fabric is rinsed three times in a water bath, each time for 10 minutes at 60° C. Finally, the product is treated in a rinsing bath containing 0.5-2.0 g/l acetic acid at 60° C. for 10 minutes. The residual bath is colourless.

EXAMPLE 2

Comparison

A 10 g piece of a bleached cotton tricot is dyed by exhaust process with a blue reactive dye (Novacron Blue FN-R, supplied by Huntsman) at a liquor ratio of 1:10 (2.0 BZT). The dyed material is taken out of the liquor and rinsed in a water bath for 10 minutes at 40° C. The dyed cotton tricot piece is then treated in a rinsing bath containing 0.5-2.0 g/l acetic acid at 70° C. for 10 minutes. Subsequently, it is treated with an aqueous liquor comprising 2 g/l of a commercially available soaping agent (modified poly(acrylic acid)) for 10 minutes at 98° C. Afterwards, the tricot piece is rinsed in a water bath for 10 minutes at 80° C., then for 10 minutes at 60° C. and finally for 10 minutes at 40° C. The residual bath is slightly coloured.

The dyed specimens are tested according to standard methods (ISO 105 E01) with respect to several fastness properties. The results are summarised in Table 1.

TABLE 1

| | Example 1 (invention) | Example 2 (comparison) |
|---|---|---|
| Fastness to washing | 3 | 3 |
| Fastness to water (severe) | 4 | 3 |
| Fastness to rubbing | 3 | 3 |
| Fastness to light | 3 | 3 |
| Fastness to perspiration (alkali) | 4 | 3 |
| Fastness to perspiration (acid) | 4 | 3 |

What is claimed is:

1. A process for afterclearing a printed or dyed textile material which comprises treating the printed or dyed textile material according to an exhaust process with an aqueous liquor containing a composition consisting of
- (a) 20 to 80% by weight of a copolymer obtained by polymerising N-vinylimidazole and N-vinylpyrrolidone and
- (b) 20 to 80% by weight of a polyethyleneimine wherein the % by weight is based on the total weight of components (a)+(b),
- (c) water and (d) optionally electrolytes, dispersants, wetting agents, and antifoams.

2. A process according to claim 1 wherein the composition comprises as component (b) a modified polyethyleneimine.

3. A process according to claim 2 wherein the composition comprises as component (b) a partially amidated or a partially alkoxylated polyethyleneimine.

4. A process according to claim 3 wherein the composition comprises as component (b) a partially amidated polyethyleneimine obtained by reaction of a polyethyleneimine with a carboxylic acid, anhydride, ester, chloride or amide.

5. A process according to claim 3 wherein the composition comprises as component (b) a partially ethoxylated polyethyleneimine obtained by reaction of a polyethyleneimine with ethylene oxide.

6. A process according to claim 1, wherein the temperature of the aqueous liquor is 50-70° C.

7. A process according to claim 6 wherein the pH value of the aqueous liquor is 10-12.

8. A process according to claim 1 wherein said textile material is printed or dyed with reactive dyes.

\* \* \* \* \*